United States Patent
Gay et al.

(10) Patent No.: US 10,402,060 B2
(45) Date of Patent: Sep. 3, 2019

(54) SYSTEM AND METHOD FOR GESTURE DISAMBIGUATION

(71) Applicant: Orange, Paris (FR)

(72) Inventors: Julian Gay, San Francisco, CA (US); Guillaume Payan, San Francisco, CA (US); Boris Henriot, San Francisco, CA (US)

(73) Assignee: ORANGE, Paris (FR)

( * ) Notice: Subject to any disclaimer, the term of this patent is extended or adjusted under 35 U.S.C. 154(b) by 382 days.

(21) Appl. No.: 14/316,328

(22) Filed: Jun. 26, 2014

(65) Prior Publication Data

US 2015/0007042 A1    Jan. 1, 2015

Related U.S. Application Data

(60) Provisional application No. 61/840,677, filed on Jun. 28, 2013.

(51) Int. Cl.
*G06F 3/01* (2006.01)
*G06F 3/038* (2013.01)
(Continued)

(52) U.S. Cl.
CPC ............ *G06F 3/0484* (2013.01); *G06F 3/017* (2013.01); *G06F 3/038* (2013.01); *G06F 3/0416* (2013.01); *G06F 3/04883* (2013.01)

(58) Field of Classification Search
CPC ........ G06F 3/0484; G06F 3/017; G06F 3/038; G06F 3/0416; G06F 3/04883;
(Continued)

(56) References Cited

U.S. PATENT DOCUMENTS

| | | | | |
|---|---|---|---|---|
| 5,546,538 A | * | 8/1996 | Cobbley | G06F 3/0488 709/203 |
| 6,075,895 A | * | 6/2000 | Qiao | A63F 13/06 382/103 |

(Continued)

FOREIGN PATENT DOCUMENTS

| | | |
|---|---|---|
| EP | 2458525 A1 | 5/2012 |
| WO | 2007089766 A2 | 8/2007 |

OTHER PUBLICATIONS

International Search Report and Written Opinion dated Jun. 16, 2014 for corresponding International Application No. PCT/IB2014/000571, filed Mar. 26, 2014.
(Continued)

*Primary Examiner* — Jennifer N To
*Assistant Examiner* — Liang Y Li
(74) *Attorney, Agent, or Firm* — David D. Brush; Westman, Champlin & Koehler, P.A.

(57) ABSTRACT

Optimized distributed disambiguation of gestures is disclosed. In one innovative aspect, there is a gesture controlled device. The gesture controlled device includes a sensor configured to detect an input gesture. The gesture controlled device also includes a gesture detector configured to obtain the input gesture. The gesture controlled device further includes a transmitter configured to transmit a candidate gesture request including a first portion of the input gesture, the transmission based at least in part on a resource characteristic of the gesture controlled device. The gesture controlled device also includes a receiver configured to receive a set of candidate gestures for the candidate gesture request. The gesture detector is configured to identify the input gesture based on a second portion of the input gesture and the received set of candidate gestures.

12 Claims, 6 Drawing Sheets

(51) Int. Cl.
  *G06F 3/041* (2006.01)
  *G06F 3/0484* (2013.01)
  *G06F 3/0488* (2013.01)
(58) Field of Classification Search
  CPC ...... G06F 3/0488–04886; G06F 3/048; G06K 9/00402–00436; G06K 9/0055–00563; G06K 9/4609–4638; G06K 9/222; G06K 9/00436
  See application file for complete search history.

(56) References Cited

U.S. PATENT DOCUMENTS

| | | | |
|---|---|---|---|
| 6,747,676 | B2 | 6/2004 | Botz et al. |
| 8,136,053 | B1 | 3/2012 | Miller et al. |
| 8,532,976 | B2 | 9/2013 | Tanaka et al. |
| 8,639,896 | B2 | 1/2014 | Bank et al. |
| 8,751,972 | B2 * | 6/2014 | Ouyang ............. G06F 3/04883 715/863 |
| 8,830,181 | B1 * | 9/2014 | Clark ................ G06F 3/04883 345/173 |
| 9,053,293 | B2 | 6/2015 | Latzina |
| 9,245,154 | B2 | 1/2016 | Andreasson |
| 9,606,643 | B2 | 3/2017 | Aguera-Arcas et al. |
| 9,619,037 | B2 | 4/2017 | St. Clair |
| 9,665,178 | B2 | 5/2017 | Bukurak et al. |
| 9,757,645 | B2 | 9/2017 | Seo |
| 9,898,642 | B2 | 2/2018 | Han et al. |
| 2005/0152600 | A1 * | 7/2005 | Chen ..................... G06K 9/222 382/187 |
| 2010/0248689 | A1 | 9/2010 | Teng et al. |
| 2010/0306718 | A1 | 12/2010 | Shim et al. |
| 2011/0041102 | A1 | 2/2011 | Kim |
| 2011/0088086 | A1 | 4/2011 | Swink et al. |
| 2011/0130170 | A1 | 6/2011 | Han et al. |
| 2011/0187497 | A1 | 8/2011 | Chin |
| 2011/0279384 | A1 | 11/2011 | Miller et al. |
| 2011/0283241 | A1 | 11/2011 | Miller et al. |
| 2011/0294467 | A1 | 12/2011 | Kim et al. |
| 2012/0016641 | A1 | 1/2012 | Raffa et al. |
| 2012/0194440 | A1 | 8/2012 | Ramrattan et al. |
| 2012/0262388 | A1 | 10/2012 | Huang et al. |
| 2012/0313848 | A1 | 12/2012 | Galor et al. |
| 2013/0081133 | A1 | 3/2013 | Hetroy |
| 2013/0111408 | A1 | 5/2013 | Berus |
| 2013/0160110 | A1 | 6/2013 | Schechter et al. |
| 2013/0187869 | A1 * | 7/2013 | Rydenhag ........... G06F 3/04883 345/173 |
| 2013/0194206 | A1 | 8/2013 | Chang et al. |
| 2013/0229367 | A1 | 9/2013 | Pinch |
| 2013/0239058 | A1 | 9/2013 | Yao et al. |
| 2013/0271360 | A1 | 10/2013 | MacDougall et al. |
| 2013/0283199 | A1 | 10/2013 | Selig et al. |
| 2013/0305352 | A1 | 11/2013 | Narendra et al. |
| 2013/0312083 | A1 | 11/2013 | Farraro et al. |
| 2013/0346921 | A1 | 12/2013 | Shiplacoff et al. |
| 2014/0002375 | A1 | 1/2014 | Rydenhag et al. |
| 2014/0033136 | A1 | 1/2014 | St. Clair |
| 2014/0149916 | A1 * | 5/2014 | Manoff ................ G06F 3/0488 715/781 |
| 2014/0267064 | A1 | 9/2014 | Lu |
| 2014/0325405 | A1 * | 10/2014 | Smolinski ............ G06T 11/203 715/764 |
| 2014/0344766 | A1 * | 11/2014 | Cao ........................ G06F 3/017 715/863 |
| 2014/0365949 | A1 * | 12/2014 | Xia .................... G06K 9/00436 715/780 |
| 2015/0043824 | A1 * | 2/2015 | Akhavan Fomani ........................ G06F 3/0237 382/188 |
| 2015/0089449 | A1 | 3/2015 | Yeh |
| 2015/0147065 | A1 | 5/2015 | Civelli et al. |

OTHER PUBLICATIONS

Alon J et al: "A Unified Framework for Gesture Recognition and Spatiotemporal Gesture Segmentation", IEEE Transactions on Pattern Analysis and Machine Intelligence, IEEE Computer Society, USA, vol. 30, No. 9, Sep. 1, 2009 (Sep. 1, 2009), pp. 1685-1699, XP011292685, ISSN: 0162-8828.
European Search Report and Written Opinion dated Nov. 10, 2014 for corresponding European Patent Application No. EP14306018, filed Nov. 10, 2014.
Office Action dated Sep. 8, 2017 for U.S. Appl. No. 14/781,250, filed Sep. 29, 2015.
Final Office Action dated May 31, 2018 for related U.S. Appl. No. 14/781,250, filed Sep. 29, 2015.
Notice of Allowance dated Oct. 10, 2018 for related U.S. Appl. No. 14/781,250, filed Sep. 29, 2015.

* cited by examiner

SYSTEM AND METHOD FOR GESTURE DISAMBIGUATION

CROSS REFERENCE TO RELATED APPLICATION(S)

This application claims priority to U.S. Provisional Patent Application No. 61/840,677, filed on Jun. 28, 2013, the disclosure of which is incorporated by reference in its entirety.

BACKGROUND

Field

The present application relates generally to disambiguation of gestures and more specifically to systems, methods, and devices for optimized distributed disambiguation of gestures.

Description of Related Technology

The ease with which a human can interact with a device is becoming an increasingly important feature for electronic devices. Gestures are an intuitive way for a human to provide an input to a device. It is relatively easy for humans to visually identify a gesture such as an abstract continuous line or shape. For a computing device however, this process can be resource intensive as the gesture is translated into the digital realm for identification. The process may involve memory to store not only the points for the input gesture but also the library of known gestures for comparing. The process may involve processing resources to compare the points received to the gestures included in the library. The process may involve power resources to perform one or more of the above functions. The process may also consume time which may provide a delayed user experience as the device tries to identify the gesture.

Typical gesture-recognition processes are initiated when the end-point of the gesture is detected, for example when the user's finger leaves the touch sensitive surface or the motion stops in a localized area for a prolonged period of time. The pattern described between the start-point of the gesture (detected when the user's finger touches the 'touch sensitive surface' or enters a field of view of the gesture recognition device) is compared against a previously stored database of gestures. In some cases, there may be a tolerance for the gesture comparison rather than requiring a precise match. If the gesture pattern matches a previously stored pattern an action occurs, for example unlocking a smartphone.

Pattern recognition typically occurs locally to the device (e.g., on the smartphone). Alternatively, the pattern may be transmitted to a server for identification. However, in mobility situations, the server may be unavailable to provide an identification of the gesture. These constraints may limit the complexity of the gestures which may be recognized.

SUMMARY OF CERTAIN INNOVATIVE ASPECTS

In one innovative aspect, there is a gesture controlled device. The gesture controlled device includes a sensor configured to detect an input gesture. The sensor may include one or more of a camera, an infrared detector, a touchscreen, a stylus, a neuro-transmitter, a gyroscope, or a touchpad. The gesture controlled device also includes a gesture detector configured to obtain the input gesture. The gesture detector may be configured to obtain the input gesture directly from the sensor or from a memory.

The gesture controlled device further includes a transmitter configured to transmit a candidate gesture request including a first portion of the input gesture, the transmission based at least in part on a resource characteristic of the gesture controlled device. The gesture controlled device also includes a receiver configured to receive a set of candidate gestures for the candidate gesture request. The gesture detector is configured to identify the input gesture based on a second portion of the input gesture and the received set of candidate gestures.

The gesture controlled device may include a memory storing one or more gestures and respective identifiers, wherein the stored one or more gestures include a custom defined gesture associated with a user of the gesture detection device. The gesture detector may be configured to identify a local set of candidate gestures from the memory based on the first portion of the input gesture. For example, the gesture detector is may be configured to identify the local set of candidate gestures when the transmitter does not transmit the candidate gesture request. As another example, the gesture detector may be configured to identify the local set of candidate gestures when the set of received candidate gestures is empty.

In a further innovative aspect, there is a method of identifying a gesture. The method includes obtaining an input gesture via a gesture controlled device. The method also includes transmitting a candidate gesture request including a first portion of the input gesture, the transmitting based at least in part on a resource characteristic of the gesture controlled device. The method further includes receiving a set of candidate gestures for the candidate gesture request. The method also includes identifying the input gesture based on a second portion of the input gesture and the received set of candidate gestures.

The method may include storing one or more gestures and respective identifiers, wherein the stored one or more gestures include a custom defined gesture associated with a user of the gesture detection device. The method may also include identifying a local set of candidate gestures of the stored gestures based on the first portion of the input gesture. In some implementations, the local set of candidate gestures is identified when the transmitter does not transmit the candidate gesture request. In some implementations, the local set of candidate gestures is identified when the set of received candidate gestures is empty.

In another innovative aspect, there is a computer-readable storage medium comprising instructions executable by a processor of a gesture controlled device. The instructions cause the gesture controlled device to perform the method of identifying a gesture described above.

In one or more of the above innovative aspects, the resource characteristic of the gesture controlled device may include one or more of power available, bandwidth available, processor load, load of a network to which the gesture controlled device is attached, and hardware included in the gesture controlled device. The input gesture includes one or more points and a sequence in which the one or more points are detected. The one or more points can include two or three dimensions.

The candidate gesture request can include two points for the input gesture, and a sequence identifier indicating an order in which the two points were input.

In yet another innovative aspect, there is a gesture optimization device. The gesture optimization device includes a memory including one or more gestures and respective identifiers. The gesture optimization device further includes a receiver configured to receive a candidate gesture request including a first portion of an input gesture. The gesture optimization device also includes a gesture identification circuit configured to identify at least one of the one or more gestures based on the first portion of the input gesture. The gesture optimization device further includes a transmitter configured to transmit a set of candidate gestures for the candidate gesture request, the set including the identified gestures.

In some implementations, the transmitter may be further configured to transmit a session identifier for the candidate gesture request. In such implementations, the gesture identification circuit can be configured to identify at least one of the one or more gestures based on a subsequent candidate gesture request including a second portion of the input gesture and the session identifier.

In one innovative aspect, there is a method of identifying a gesture. The method includes obtaining one or more gestures and respective identifiers. The method also includes receiving a candidate gesture request including a first portion of an input gesture. The method further includes identifying, via an electronic device, at least one of the one or more gestures based on the first portion of the input gesture. The method also includes transmitting a set of candidate gestures for the candidate gesture request, the set including the identified gestures.

In some implementations, the method includes transmitting a session identifier for the candidate gesture request. In such implementations, identifying at least one of the one or more gestures may be further based on a subsequent candidate gesture request including a second portion of the input gesture and the session identifier.

In yet another innovative aspect, there is a computer-readable storage medium comprising instructions executable by a processor of an apparatus for identifying gestures. The instructions cause the apparatus to perform the method of identifying a gesture described above.

In one or more of the above innovative aspects, the candidate gesture request may include two points for the input gesture, and a sequence identifier indicating an order in which the two points were input. The candidate gesture request may further include one or more of an application identifier indicative of an application associated with the input gesture, a location identifier indicative of a geospatial location for a device generating the candidate gesture request, one or more capabilities of the device generating the candidate gesture request, and a resource characteristic of the device generating the candidate gesture request. The resource characteristic can include one or more of power available, bandwidth available, processor load, load of a network to which the device generating the candidate gesture request is attached, and hardware included in the device generating the candidate gesture request.

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include optimized gesture disambiguation.

DETAILED DESCRIPTION OF CERTAIN ILLUSTRATIVE EMBODIMENTS

Figure 1:
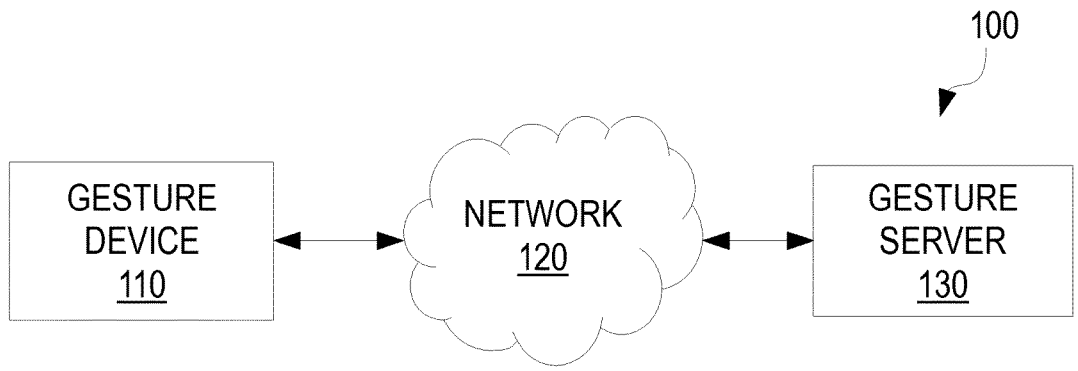
FIG. 1 is a functional block diagram of an example system including gesture identification devices.

To provide reliable and efficient gesture recognition, there exists the opportunity to use powerful, server-based, resources to process gesture patterns. Described herein are systems, devices, and methods for optimizing the recognition of gestures by intelligently processing the gesture pattern using server-based computational resources. The number of possible pattern matches may be progressively refined as the gesture is in the process of being 'drawn' so that when the gesture 'ends' the system may be responsive to the user.

Based on an initial portion of a gesture, a match for the input gesture could be a gesture included in a set of two possible gestures. In identifying the set of candidate matches, certain other gestures may be excluded. If gesture data is progressively sent to a remote server, the server could provide the candidate matches to the client application thereby reducing the gesture identification computation performed by the client. When the gesture ends the client may only needs to differentiate between the candidate matches which could be computed locally (e.g., on the client device) with reduced computational resource consumption as compared to a traditional gesture identification. Furthermore, as the server provides incremental candidate matches, the client device may generate the positive identification of the gesture faster than systems where the full gesture is transmitted to a server for identification and an identification response is received.

Thus, an optimization is provided for the relative computing power between a client (such as a smartphone) on a server and the bandwidth between them to progressively reduce the possible patterns matching the 'in progress' gesture. For example, if there is abundant bandwidth, more of the gesture processing could be executed on the server. This can produce a resource optimized (e.g., power, bandwidth, memory, processor) and responsive user experience as compared to identification which is executed solely on the client.

For example, consider a user entering a gesture on a smartphone. As the user begins the gesture, the device is connected to a Wi-Fi network in an office. Typically, such networks afford high bandwidth with relatively low latency. A first portion of the gesture may be transmitted to server to obtain a set of candidate matches. As the response is received, the user may step into an elevator while continuing the gesture. As the elevator door closes, the device disconnects from the Wi-Fi network. Before exiting the elevator, the user completes the gesture. Based on a second portion of the gesture (e.g., that received while in the elevator) and the candidates received from the server, the gesture may be identified. In some instances, where the device does not include a gesture definition for the input gesture, absent access to the server, this scenario would result in a failure to identify or deferred identification. In either case, the user experience may be negatively impacted. However, because the first portion of the gesture was transmitted and candidates received, the identification was able to proceed even though the device did not remain connected to a network.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different gesture identification technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a functional block diagram of an example system including gesture identification devices. The system 100 shown in FIG. 1 includes two gesture identification devices. A first gesture identification device shown is a gesture device 110. The gesture device 110 may be a smartphone, tablet computer, personal computer, laptop computer, set-top-box, game console, personal portable game device, or other electronic device configured to receive a gesture input.

A gesture input generally refers to a sequence of points each point including two or three dimensions. A gesture may be input via a sensor coupled to the gesture device 110. Examples of the sensor include a camera, an infrared detector, a touchscreen, a stylus, a neuro-transmitter, a gyroscope, or a touchpad.

The gesture device 110 shown is further configured to communicate with a network 120. The network 120 may be a packet switched network, a public network, a wide-area network, a private area network, a mesh network, a cellular network, a radio network, a local area network, a fiber optic network, or other such communication network configured to transmit and receive data between devices.

The system 100 also includes a second gesture identification device, namely a gesture server 130. The gesture server 130 may be configured to provide candidate matches for portions of input gestures. The gesture server 130 may receive requests for candidate matches from the gesture device 110 and transmit a response including the possible gesture matches via the network 120. The gesture server 130 may include a memory and/or be in data communication with one or more external memories. These memories may include gesture definitions which may be searched based on the received portion of input gestures.

Figure 2:
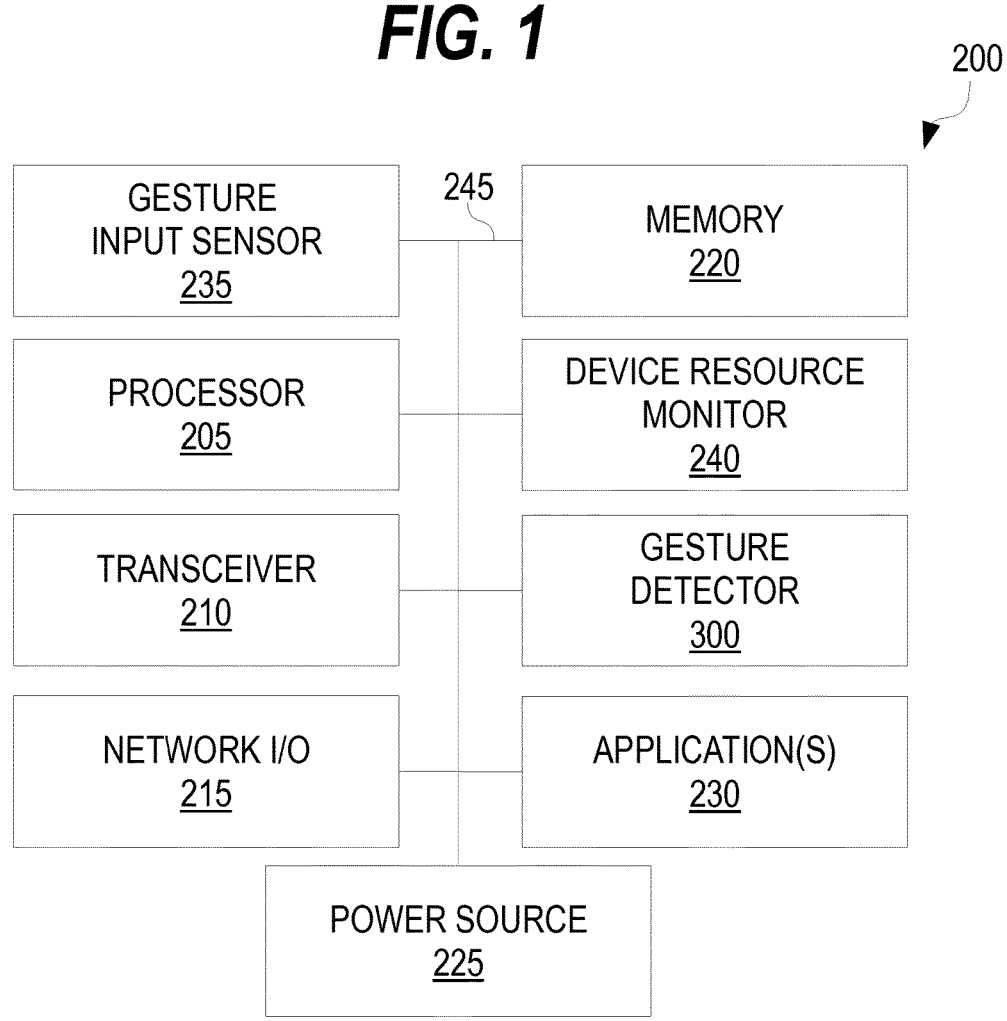
FIG. 2 is a functional block diagram of an example of a gesture identification device.

FIG. 2 is a functional block diagram of an example of a gesture identification device. The gesture identification device 200 may be configured as a gesture device, such as the gesture device 110 described above. The gesture identification device 200 may be configured as a gesture server, such as the gesture server 130 described above.

The gesture identification device 200 includes a processor 205. The gesture identification device 200 may include one or more antennas (not shown) and a transceiver 210 for the transmission and reception of wireless signals; a power source 225 (e.g., battery, solar panel, wired power connection); a memory 220; and a processor 205. The processor 205 may be configured to coordinate the operation and/or functions of the various elements of the gesture identification device 200. In some implementations, the coordination may be achieved through instructions stored in the memory 220 which may be executed by the processor 205 to perform all or parts of the methods described herein.

The memory 220 may include a gesture library. The gesture library is a set of gestures and associated identifiers. The identifiers can be used to indicate a unique gesture. In some implementations, the gesture library may also associate a context with each gesture. For example, when in email a particular gesture may have a first meaning, but when watching a video, a particular gesture may have a second meaning. Context may be defined by one or more of the application receiving the gesture input, an application executing when the gesture input is received, device information (e.g., geospatial location, battery life, resource characteristic) when the gesture input is received, network to which the device is coupled, operator of the network to which the device is coupled, and the like. In one implementation, each operator may include their own gesture definitions. Accordingly, the gesture server may be include the gestures for a specific location. In such implementations, the gesture device would need definitions for every network it intended to connect with. However, using the aspects described herein, the device can dynamically identify gestures.

The gesture identification device 200 shown also includes a network input/output module 215. The network input/output module 215 may be configured for communication via the network 120. The network input/output module 215 may communicate via the transceiver for wireless communications. In some implementations, the network input/output module 215 may include an Ethernet adapter for wired communication via Ethernet, a fiber optic adapter for wired communication via a fiber optic network, a USB port for wired USB network communication, and the like.

The gesture identification device 200 may further include one or more applications 230. The applications 230 provide additional functionality to the gesture identification device 200. Examples of applications 230 include security applications (e.g., gesture-based device lock/unlock application), games, communication applications (e.g., instant messenger, email, text messaging, video chat, voice call), entertainment (e.g., movie player, audio player) and the like. Some applications 230 may be configured to process gesture input information. One example is a gesture-based device lock/unlock application. Based on a received gesture input, the device may unlock one or more functions. Some applications 230 may be configured to be triggered by a gesture input. For example, a user may define a gesture input and when the gesture input is received, a certain song is played via an audio player and the device is switched into airplane mode.

An application may receive a gesture input via a gesture input sensor 230. The gesture identification device 200 may include multiple gesture input sensors. Examples of the gesture input sensor 230 include a camera, an infrared detector, a touchscreen, a stylus, a neuro-transmitter, a gyroscope, or a touchpad.

The gesture identification device 200 may include a device resource monitor 240. The device resource monitor 240 is configured to monitor resource characteristics of the gesture identification device 200. The resource characteristics monitor include one or more of power available, bandwidth available, processor load, load of a network to which the gesture identification device 200 is attached, and hardware included in or coupled to the gesture identification device 200. The resource information may be provided to a gesture detector 300 for use in optimizing the gesture identification as will be discussed in further detail below.

A bus 245 may couple the above described elements for the gesture identification device 200. The bus 245 may be a data bus, communication bus, or other bus mechanism to enable the various components of the gesture identification device 200 to exchange information. It will further be appreciated that while different elements have been shown, multiple elements may be combined into a single element, such as the gesture input sensor 235 and the gesture detector 300.

Figure 3:
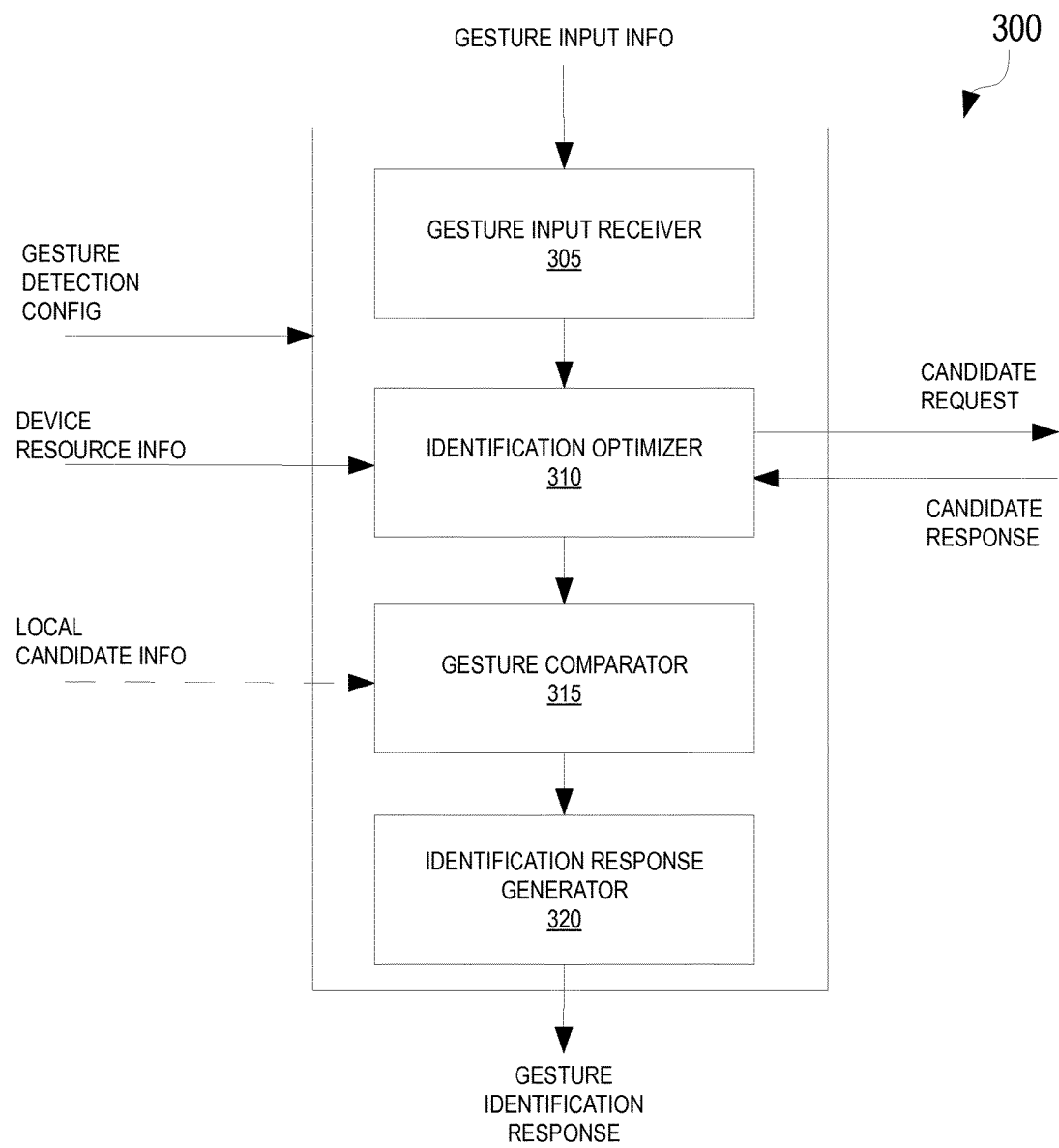
FIG. 3 is a functional block diagram of an example of an optimized gesture detector.

FIG. 3 is a functional block diagram of an example of an optimized gesture detector. The gesture detector 300 may be included in a gesture device, such as the gesture device 110, or in a gesture server, such as the gesture server 130. The optimization may extend to each gesture identification device included for a particular identification. For example, a gesture device may transmit a candidate request to a gesture server. The gesture server may in turn transmit a candidate request to another gesture server. For instance, if the gesture server is experiencing a high load, the candidate request may be transmitted to another gesture server.

The gesture detector 300 receives gesture input information. When implemented in the gesture device 110, the gesture input information is received from the gesture input sensor 235. This will generally be the source of the gesture. When implemented in the gesture server 130, the gesture input information may include all or just a portion of the gesture information.

As another input, the gesture detector 300 may receive gesture detection configuration information. The gesture detection configuration information may include an address of the gesture server 130. The gesture detection configuration information may include optimization threshold information. For example, the configuration may include a minimal resource characteristic needed to perform the identification optimization. The gesture detection configuration information may be shared with the elements of the gesture detector 300. The gesture detection configuration information may be provided via the network 120, via the transceiver 210, or otherwise provisioned for the gesture detector 300. The gesture detection configuration information may be stored in and retrieved from the memory 220.

The gesture input information is received by a gesture input receiver 305. The gesture input receiver 305 may be configured to process the received gesture information. For example, the gesture input receiver 305 may be configured to receive gesture input information from a variety of gesture input sensors. The gesture input receiver 305 may be configured to normalize the input gesture information for subsequent processing.

The gesture detector 300 includes an identification optimizer 310. The identification optimizer may receive the gesture input information along with device resource information. Based on the device resource information, the identification optimizer 310 will determine whether or not identification optimization should be performed for the gesture input information. For example, if ample bandwidth is available for the device, the optimization may proceed. Ample bandwidth or other determination factors may be defined in the gesture detection configuration. In some implementations, the determination factors may be based on an application associated with the gesture input information, context for the device, or other characteristics.

In an additional embodiment of the present system, the gesture controlled device may comprise an analyzer to define the candidate gesture request that includes a first portion of the input gesture.

In the case where the optimization is performed, a candidate gesture request is generated and transmitted a transmitter comprised in the analyzer here above, using the identification optimizer 310, to the gesture server 130. The set of candidate gestures is received via a candidate response. The candidate matches are provided to the gesture comparator along with the gesture input information. In the case where the optimization is not performed, the gesture input information without the candidates is provided to the gesture comparator 315.

The gesture comparator 315 is configured perform an identification of the gesture based on the gesture input information and candidates. When the gesture comparator 315 receives a set of candidate gestures from the identification optimizer 315, the gesture comparator 315 is configured to identify the gesture from the set of candidates received. In some implementations, the gesture comparator 315 may also receive local candidate gesture information. The local candidate gesture information may be candidate gestures stored in a local gesture library for the device. The comparison may include comparing the sequence of points included in the input gesture information to the sequence of points for the set of candidates. The comparison may further include consideration of the context. The comparison may be based on additional gesture input information received. For example, the gesture may include several inflection points (e.g., vertices). The identification optimizer 310 may be configured to obtain candidates for a set of points up-to the first inflection point. The subsequent points for the input gesture may be passed-through to the gesture comparator 315. Accordingly, the gesture comparator 315 need only match the points after the first inflection point with the received candidate gestures.

An identification response generator 320 is configured to receive an identification result from the gesture comparator 315. In some implementations, the gesture comparator 315 may identify the gesture. In such implementations, the identification response generator 320 may generate an event message including a value associated with the identified gesture. The event message may be provided by the gesture detector 300 for further processing (e.g., by the gesture identification device 200). An example of further processing is distribution of the event message to the elements of the gesture identification device 200 via the bus 245.

When an identification is not made, the identification response generator 320 may generate a list of suggestions. For example, the set of candidates may be narrowed to a few possible gestures. The identification response generator 320 may include these remaining possibilities in a message for presentation. A response may be received indicating the desired gesture. In some circumstances, the gesture may be unknown. In such situations, the identification response may include an unknown gesture message.

Figure 4:
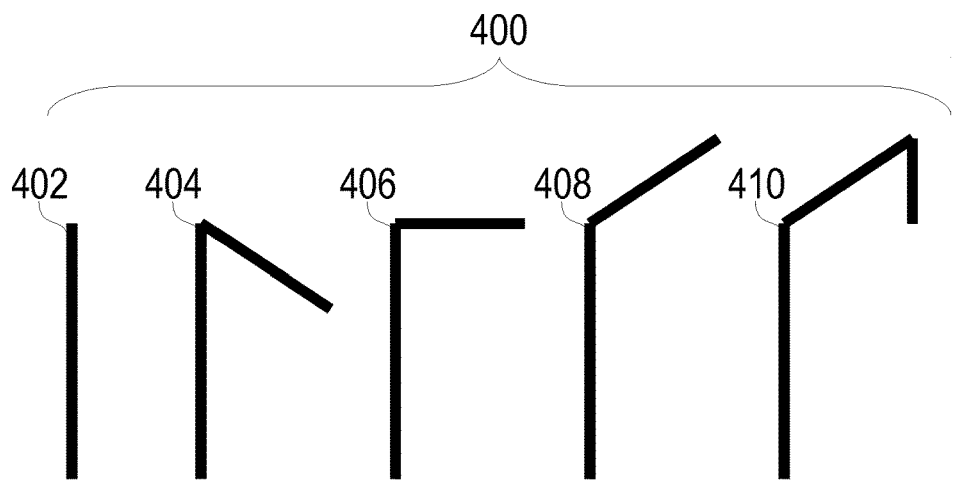
FIG. 4 is a diagram of an example set of candidate gestures.

FIG. 4 is a diagram of an example set of candidate gestures. The set 400 includes five candidate gestures, gestures 402-410. It will be understood that a library of gestures may include many more gestures. The set 400 shown in FIG. 4 represents a subset of the library which may be applicable to some input gestures, namely those including a vertical line.

Figure 5:
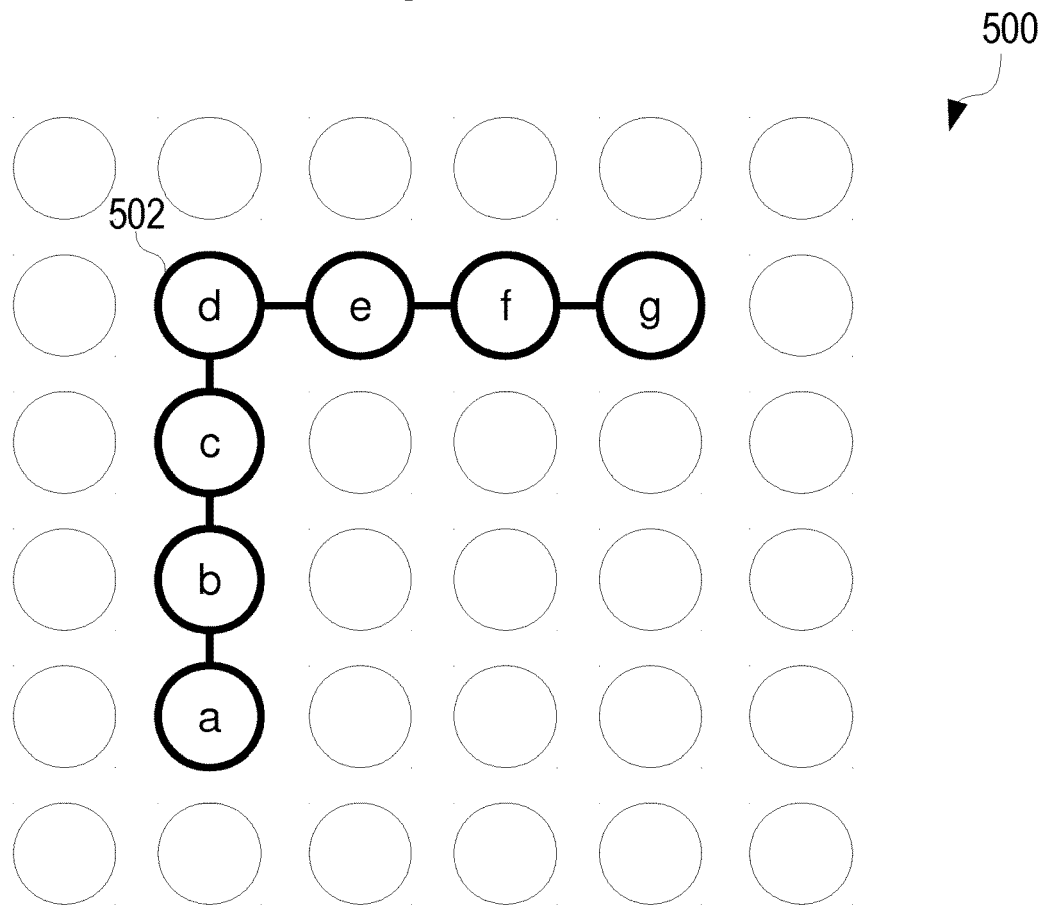
FIG. 5 is a point sequence diagram for an example input gesture.

FIG. 5 is a point sequence diagram for an example input gesture. Each dot in the matrix 500 represents a possible gesture input point. As shown in FIG. 5, a gesture 502 includes points a-g. The points are ordered whereby point a indicates the first point of the input gesture 502 and point g represents the last point of the input gesture 502. Point d is an inflection point. The inflection point may be identified based on a pause in the data received for the gesture. The inflection point may be identified based on a subsequently received point (e.g., point e) which is located in a different direction (e.g., different row or column) than the previous point.

With the set 400 of candidates from FIG. 4 and the gesture input 502 of FIG. 5 as background, an example optimization will now be described.

Figure 6:
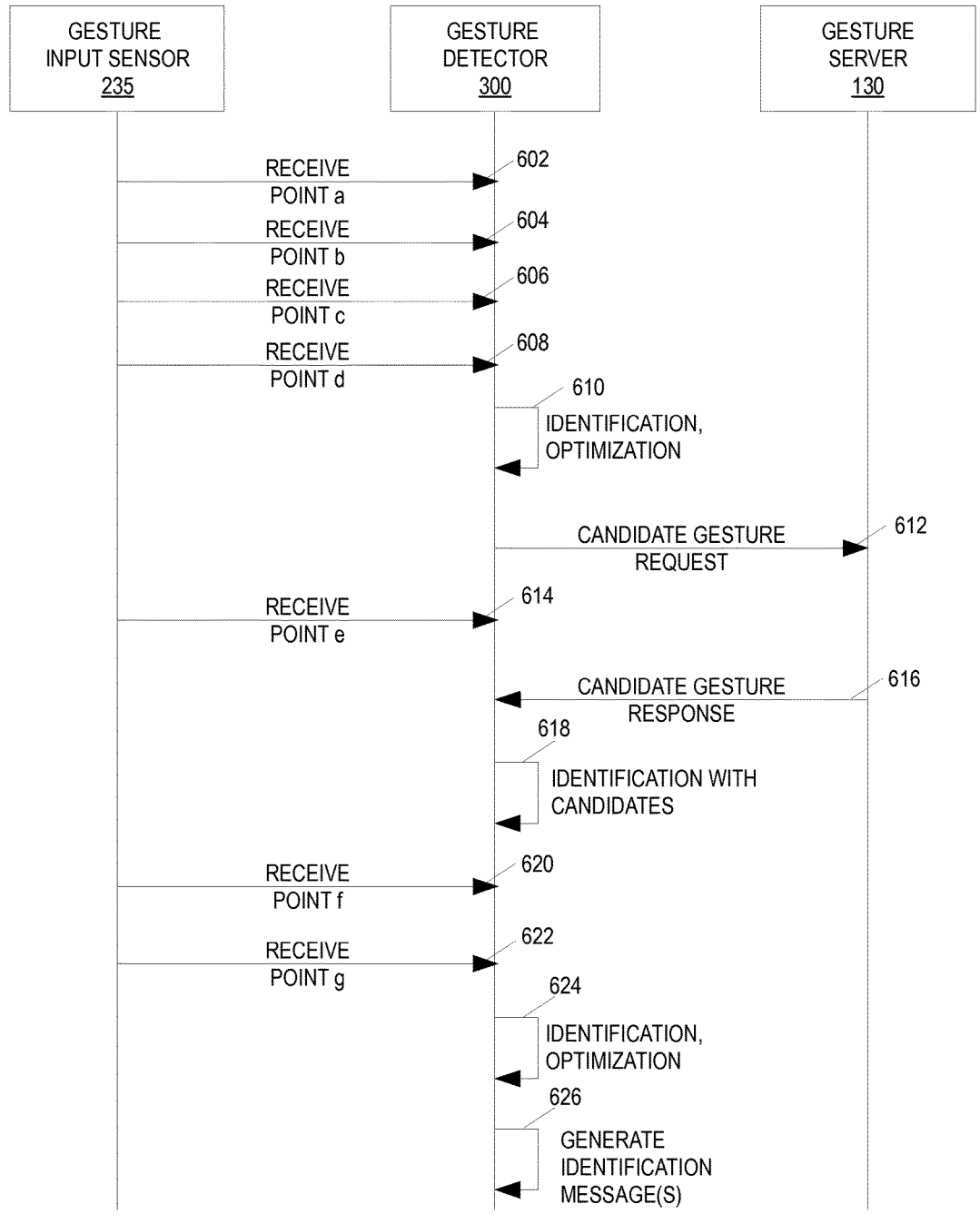
FIG. 6 is a message diagram for an example identification of the input gesture of FIG. 5.

FIG. 6 is a message diagram for an example identification of the input gesture of FIG. 5. The message flow of FIG. 6 shows messages exchanged between several entities which may be included in a gesture identification system. For ease of explanation, the number of entities shown has been limited. However, it will be understood that additional entities may be added or multiple entities combined consistent with the description herein. The message flow of FIG. 6 illustrates optimized gesture identification using the gesture server 130.

Via messages 602-608, the gesture detector 300 receives gesture points a-d from the gesture input sensor 235. Messages 610 cause the gesture detector 300 to perform gesture identification and optimization. The messages 610 may be trigged based on the detection of an inflection point, based on the number of points received, based on a period of time after receiving a point, or the like.

As discussed above, the optimization is performed based on resource characteristics of the device. As shown in FIG. 6, adequate resources are available and thus the identification optimization is performed. Message 612 is transmitted from the gesture detector 300 to the gesture server 130. The message 612 includes a candidate gesture request. The candidate gesture request includes a first portion of the input gesture, namely points a-d. The candidate gesture request includes two points for the input gesture, and a sequence identifier indicating an order in which the two points were input. The points may be represented in two or three dimensions.

While the gesture server 130 processes the gesture request 612, the gesture detector 300 receives point e from the gesture input sensor 235 via message 614.

A candidate gesture response 616 is received from the gesture server 130. The candidate gesture response 616 includes a set of candidate gestures. In some implementations, the candidate gesture response 616 may include an identification session token. The token may be used to identify the identification session for the input gesture. For example, where multiple candidate gesture requests are transmitted for the input gesture 502, the session token may be included in a subsequent candidate gesture request to allow the gesture server 130 to correlate the previous candidate requests with the current candidate request including the token.

Messaging 618 may be performed to identify the input gesture 502 based on the received candidates and a second portion of the input gesture. In the example shown in FIG. 6, the additional information is point e.

Returning to FIG. 5, the points a-d generally define a vertical line. The set 400 of gestures shown in FIG. 4 may all be candidate matches for the first portion of the input gesture 502 comprising points a-d. The set 400 shown in FIG. 4 may be included in the candidate gesture response 616.

Upon receipt of point e, gesture 402 may be excluded from the candidate set 400. Gestures 404, 408, and 410 may also be excluded as the next point following the vertex at point d is in a different row than point d. Accordingly, based on the candidate set 400 and point e, an identification of gesture 406 is made. At this point, the gesture detector 300 has two possible results: (1) the gesture input information is consistent with the identified candidate 406; or (2) the remaining gesture input information is inconsistent with the identified candidate 406.

The gesture 502 of FIG. 5 continues with points f and g. By messages 620 and 622 the information for these points is received by the gesture detector 300 from the gesture input sensor 235.

Message 624 causes further identification and/or optimization. The message 624 may identify point g as the end of the gesture 520. The end of the gesture may be identified based on a configurable timeout from the receipt of a point for the gesture. If the timeout is exceeded, the gesture may be deemed complete. The timeout may be included as a gesture detection configuration parameter. The end of the gesture may be identified based on a release event such as a signal indicative of a finger lifted off of a touchscreen, a button event (e.g., unclick or mouseup), or the like.

The final identification determination may be made based on the additional points f and g in comparison to the identified candidate gesture 406. As points f and g are consistent with the identified candidate gesture 406, a positive identification is achieved. The gesture detector may generate one or more identification messages 626 and provide these for further processing as described herein.

Had points f and g been inconsistent with the identified candidate gesture 406, the identification and optimization 624 may include identifying local candidates and/or generating an error for the identification.

For more complex gestures, the identification and optimization at point 624 may be similar to the identification and optimization performed at message 610. Subsequent candidate requests may be generated and additional sets of candidates may be received.

Figure 7:
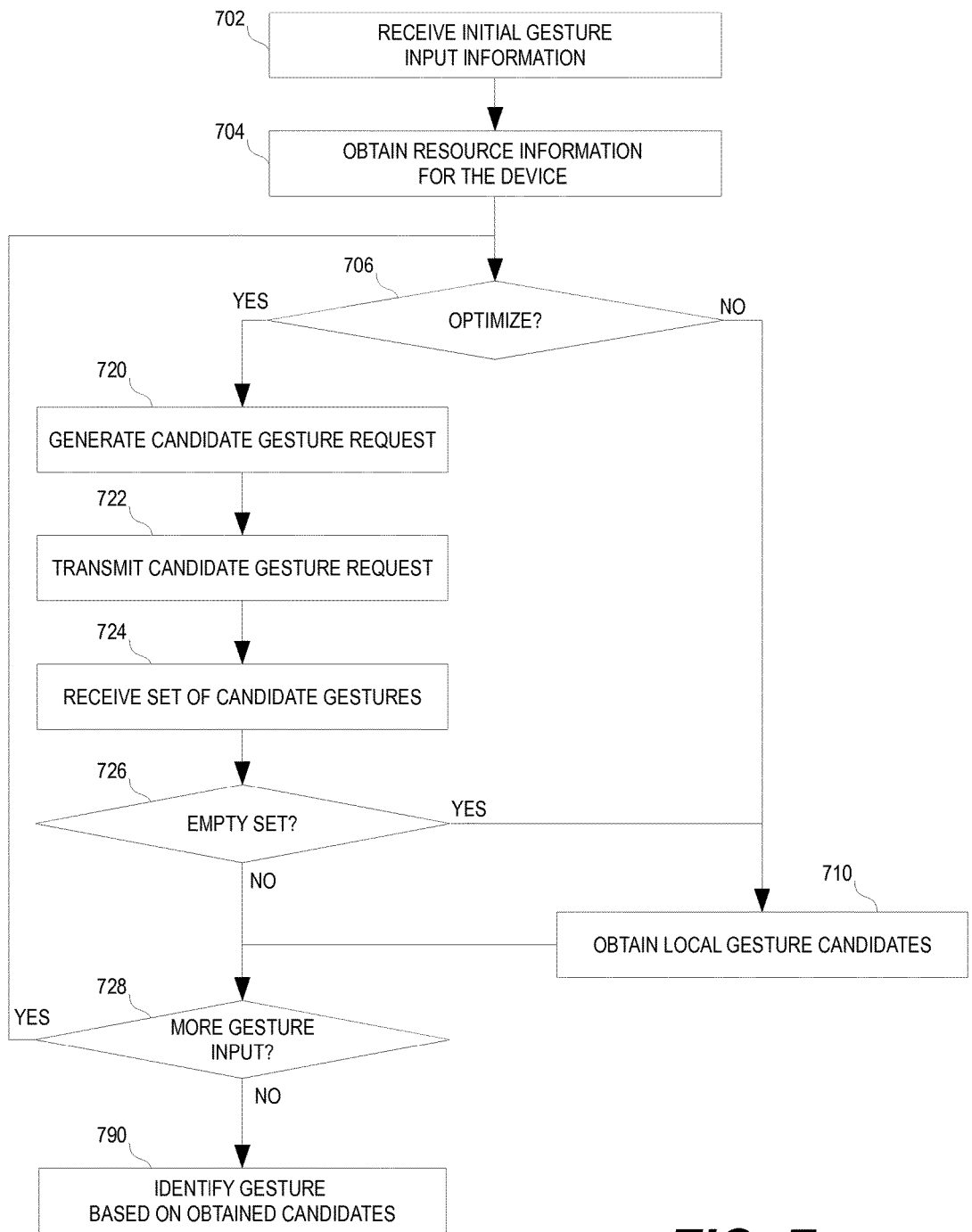
FIG. 7 is a process flow diagram for an example method of identifying an input gesture.

FIG. 7 is a process flow diagram for an example method of identifying an input gesture. The method shown in FIG. 7 may be implemented via a gesture identification device such as the gesture identification device 200 shown in FIG. 2.

At node 702, initial gesture input information is received. The gesture input information may be received from a gesture input sensor as described in reference to FIG. 2. The initial gesture input information may include one or more points for an input gesture.

At node 704, resource characteristic information is received for the device. The resource characteristic information may include power available, bandwidth available, processor load, load of a network to which the gesture controlled device is attached, and hardware included in the gesture controlled device. The resource information may be obtained in "real-time" from the device resource monitor 240 or from the memory 202.

At decision node 706, a determination is made as to whether to optimize the identification. The determination is based on the resource characteristic(s) obtained. For example, if the battery level is below a threshold, the optimization may not be performed so as to conserve the battery that may be used for transmitting and receiving the candidates.

The optimization determination may be further based on the input gesture, application receiving the input gesture, or other context information discussed above. For example, if the application is a secure application, it may be desirable to refrain from transmitting even a portion of the gesture over the network.

In some implementations, the determination result may be cached. The caching of the determination may be for a configurable period of time as specified by, for example, the determination configuration information. In such implementations, the optimization decision may rely on a previous determination rather than performing the analysis anew.

A candidate gesture request is then made. It may be either locally defined using the analyzer for forming of the request, e.g. when no optimization is needed, or transmitted as seen here after to the server. If the decision node 706 determines that optimization should not be performed, at node 720 local gesture candidates may be obtained. The local gesture candidates may be stored in the memory 202 of the gesture device 110.

At decision node 730, a determination is made as to whether additional gesture input is received. If additional input is not received, at node 790 the input gesture is identified based on the obtained candidates.

Returning to decision node 706, if a determination is made that optimization should be performed, at node 720, a candidate gesture request is generated. The candidate gesture request may include all or a portion of the input gesture information received to this point. As this may be the initial gesture input information, the candidate gesture request may include only a few points.

The candidate gesture request may also include context information such as the application receiving the gesture information, device resource information, device location information, application information, and the like. The candidate gesture request may include access/authentication information. For example, if the destination gesture sever requires a certificate for the user to secure the communications, the candidate gesture request may include the certificate information.

Generating the candidate gesture request may include generating a formatted message. The message may be formatted in a machine readable form such as XML, binary encoding, hash encoding, delimited text, fixed length fields, or the like. In some implementations, the candidate gesture request may be encrypted for security.

At node 722, the candidate gesture request is transmitted. The transmission may be via one or more wired or wireless communication channels. The transmission may be based on the detection configuration information. For example, the detection configuration information may identify the gesture server to which the request is transmitted. The transmission may also be based on device resource characteristics. For example, the available bandwidth. The transmission may be via HTTP, HTTPS, FTP, or other transport protocol.

At node 724, a set of candidate gestures is received. The set of candidate gestures may be included in a formatted response message. The response may be received via the same communication channel as used to transmit the request. In some implementations, it may be desirable to receive the response via a different communication channel than was used to transmit the request.

At decision node 726, a determination is made as to whether the received set of candidate gestures is empty. If the set is empty, the process continues to node 710 as described above. If the set is not empty, the process continues to decision node 730 as described above.

As described in this process flow, node 790 may identify the gesture based on the candidates received via the optimization and/or locally. The optimization is dynamically performed based on the resource characteristics and/or gesture identification context. This allows a flexible, efficient, progressive identification of gestures.

Figure 8:
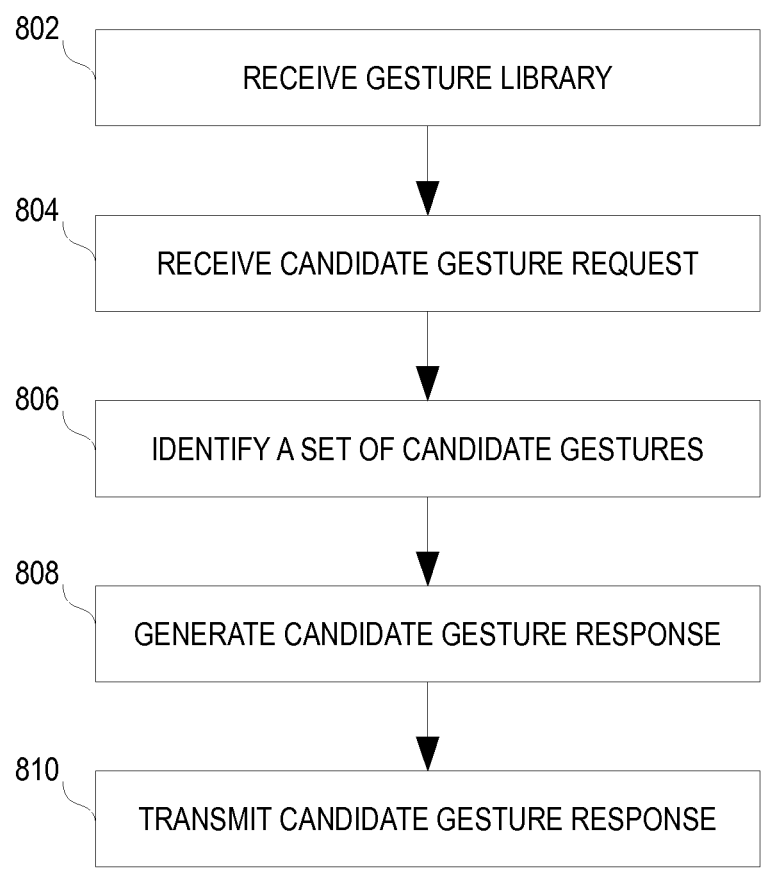
FIG. 8 is a process flow diagram for another example method of identifying an input gesture.

FIG. 8 is a process flow diagram for another example method of identifying an input gesture. The method shown in FIG. 8 may be implemented via a gesture identification device such as the gesture identification device 200 shown in FIG. 2. In general, the method shown in FIG. 8 may be implemented in a gesture server configured to provide candidates to a gesture device.

At node 802, a gesture library is received. The gesture library includes one or more gesture definitions. A gesture definition includes a plurality of points in two or three dimensions and an associated identifier. The gesture definition may further include context information which may be used to identify an input gesture as the defined gesture.

At node 804, a candidate gesture request may be received. The candidate gesture request may be similar to the candidate gesture request described above, such as with reference to FIG. 6 or 7. The candidate gesture request may be received via one or more wired or wireless communication connections. The candidate gesture request can include two points for the input gesture, and a sequence identifier indicating an order in which the two points were input.

In some implementations, the candidate gesture request further includes one or more of an application identifier indicative of an application associated with the input gesture, a location identifier indicative of a geospatial location for a device generating the candidate gesture request, one or more capabilities of the device generating the candidate gesture request, and a resource characteristic of the device generating the candidate gesture request. The resource characteristic may include one or more of power available, bandwidth available, processor load, load of a network to which the device generating the candidate gesture request is attached, and hardware included in the device generating the candidate gesture request.

At node 806, a set of candidate gestures is identified. The identification may include identifying one or more gestures included in the gesture library. In some implementations, the identification may include the optimization aspects described above. In such implementations, the gesture server may behave as a gesture device to obtain candidate gestures from another gesture server.

The candidate gesture request may be a second request for a given input gesture. In such situations, the candidate gesture request may include a session identifier. The identification at node 806 may include this identifier as part of the identification process. For example, the identifier may be used to retrieve the previously provided set of candidate gestures associated with the session. From this previous set, a sub-set may be generated based on the additional gesture information received.

At node 808, a candidate gesture response is generated. The candidate gesture response may include the set of identified candidate gestures. For some gesture requests, no candidate gestures may be identified. In such situations, the set may be empty. The generating may include generating a session identifier which may be included in the candidate gesture response.

At node 810, the candidate gesture response is transmitted. The transmission may be via one or more wired or wireless connections. The candidate gesture response may be similar to the candidate gesture response described above.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A gesture controlled device comprising:
   a sensor configured to detect an input gesture, which includes one or more points, at least one inflection point and a sequence in which the one or more points are detected;
   a gesture detector device configured to obtain the input gesture from the sensor;
   an analyzer configured to define a candidate gesture request including a first portion of the input gesture;
   a memory including one or more gestures and respective identifiers;
   a gesture server configured to receive said candidate gesture request; and
   a receiver configured to receive a set of candidate gestures for the candidate gesture request during the receipt of the input gesture by the gesture detector device;
   wherein the gesture detector device is configured to:
      detect a first inflection point by detecting a change in direction of the gesture; and
      upon detection of the first of the at least one inflection point, identify the input gesture based on a second portion of the input gesture extending from said first inflection point in combination with the received set of candidate gestures;
      when the received set of candidate gestures is empty:
         identify a local set of candidate gestures from the memory based on the first portion of the input gesture; and
         identify the input gesture based on the second portion of the input gesture in combination with the identified local set of candidate gestures.

2. The device of claim 1, the analyzer comprising a transmitter to transmit the defined candidate request, the transmission being based at least in part on a resource characteristic of the gesture controlled device, wherein the resource characteristic of the gesture controlled device includes one or more of power available, bandwidth available, processor load, load of a network to which the gesture controlled device is attached, and hardware included in the gesture controlled device.

3. The device of claim 2, wherein the gesture detector device is configured to identify the local set of candidate gestures when the transmitter does not transmit the candidate gesture request.

4. The device of claim 1, wherein the gesture detector device is configured to obtain the input gesture directly from the sensor.

5. The device of claim 1, wherein the input gesture is stored in a memory in data communication with the gesture controlled device, and wherein the gesture detector device is configured to obtain the input gesture from the memory.

6. The device of claim 1, wherein the candidate gesture request includes two points for the input gesture, and a sequence identifier indicating an order in which the two points were input.

7. The device of claim 1, wherein the one or more gestures stored in the memory include a custom defined gesture associated with a user of the gesture detection device.

8. A method of identifying a gesture by a gesture controlled device, the method comprising:
   obtaining an input gesture via a gesture controlled device, said input gesture including one or more points, at least one inflection point and a sequence in which the one or more points are detectable;
   defining a candidate gesture request including a first portion of the input gesture;
   storing one or more gestures and respective identifiers in a memory;
   receiving a set of candidate gestures for the candidate gesture request when said input gesture is received;
   detecting a first inflection point by detecting a change in direction of the gesture; and
   upon detection of the first of the at least one inflection point, identifying the input gesture comprising:
      identifying the input gesture based on a second portion of the input gesture extending from said first inflection point in combination with the received set of candidate gestures;
      when the received set of candidate gestures is empty:
         identifying a local set of candidate gestures from the memory based on the first portion of the input gesture; and
         identifying the input gesture based on the second portion of the input gesture in combination with the identified local set of candidate gestures.

9. The method of claim 8, the defining comprising transmitting the defined candidate request, the transmission being based at least in part on a resource characteristic of the gesture controlled device, wherein the resource characteristic of the gesture controlled device includes one or more of power available, bandwidth available, processor load, load of a network to which the gesture controlled device is attached, and hardware included in the gesture controlled device.

10. The method of claim 8, wherein the input gesture includes one or more points and a sequence in which the one or more points are input.

11. The method of claim 8, wherein the stored one or more gestures include a custom defined gesture associated with a user of the gesture detection device.

12. A non-transitory computer-readable storage medium comprising instructions executable by, a processor of a gesture controlled device, the instructions causing the gesture controlled device to:
   obtain an input gesture, said input gesture including one or more points, at least one inflection point and a sequence in which the one or more points are detectable;
   analyze a candidate gesture request including a first portion of the input gesture;
   store one or more gestures and respective identifiers in a memory of the gesture controlled device;
   receive a set of candidate gestures for the candidate gesture request when said input gesture is received;
   detect a first inflection point by detecting a change in direction of the gesture; and
   upon detection of the first of the at least one inflection point, identify the input gesture including:
   identify the input gesture based on a second portion of the input gesture extending from the first inflection point in combination with the received set of candidate gestures;
   when the received set of candidate gestures is empty:
      identify a local set of candidate gestures from the memory based on the first portion of the input gesture; and
      identify the input gesture based on the second portion of the input gesture in combination with the identified local set of candidate gestures.

* * * * *